Sept. 30, 1952  K. S. HALLGREN  2,612,461
METHOD FOR THE MANUFACTURE OF ELASTIC RUBBER TIRES
Filed March 21, 1949  3 Sheets-Sheet 1

INVENTOR
KARL SIMON HALLGREN

ATTORNEY

INVENTOR
KARL SIMON HALLGREN
ATTORNEY

Sept. 30, 1952     K. S. HALLGREN     2,612,461
METHOD FOR THE MANUFACTURE OF ELASTIC RUBBER TIRES
Filed March 21, 1949     3 Sheets-Sheet 3
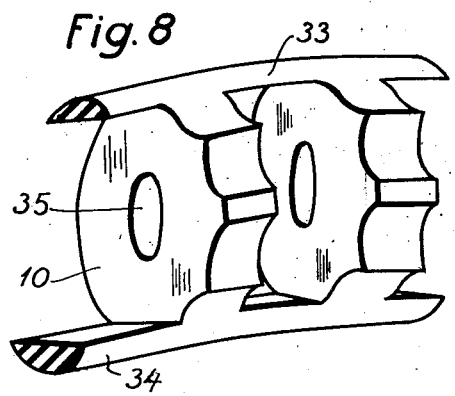
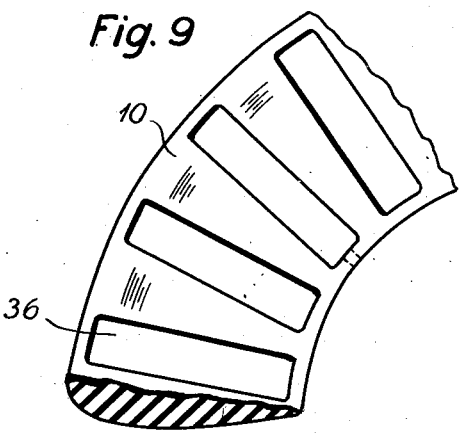
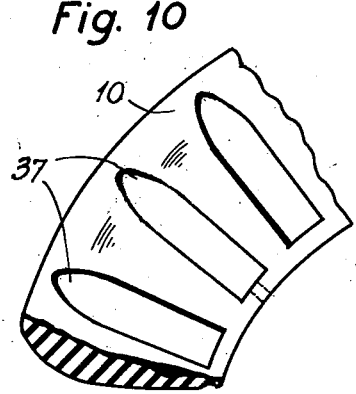
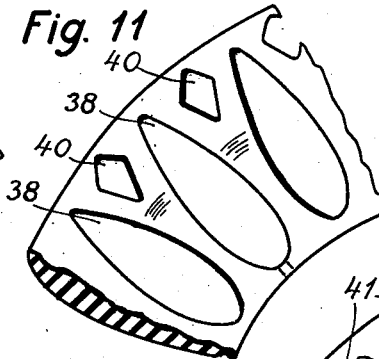
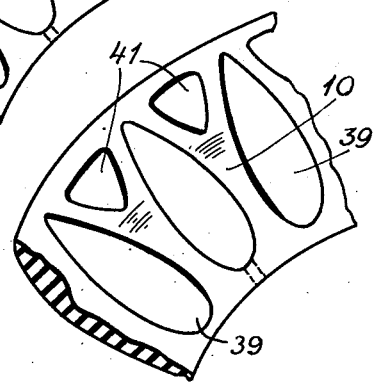
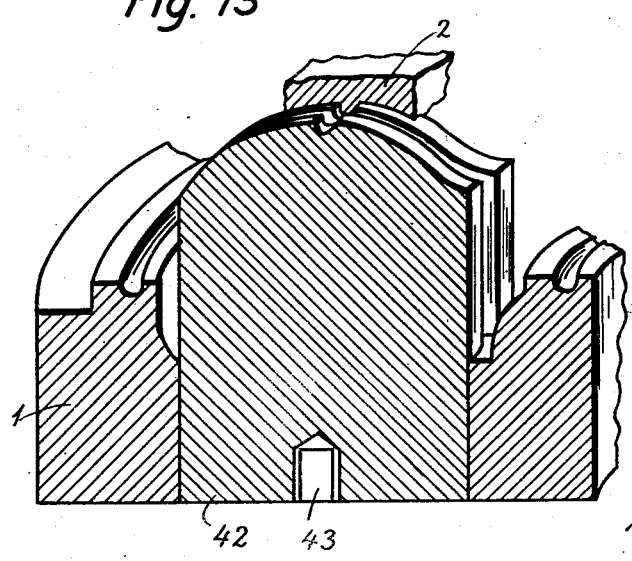
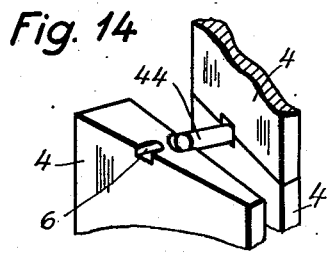
INVENTOR
KARL SIMON HALLGREN
ATTORNEY Patented Sept. 30, 1952

2,612,461

UNITED STATES PATENT OFFICE 2,612,461

METHOD FOR THE MANUFACTURE OF ELASTIC RUBBER TIRES

Karl Simon Hallgren, Copenhagen, Denmark

Application March 21, 1949, Serial No. 82,599

17 Claims. (Cl. 154—14)

The present invention deals with the manufacture of elastic caoutchouc tires having a number of internal transverse projections or flanges such as transverse walls dividing the tires up into a number of chambers.

It has previously been known to manufacture such tires by casting them in a mould in which, prior to the casting, cores for the formation of the desired hollows or chambers are placed. The cores consisted of sand or other brittle material which is held together with glutinous material. When removing the tire from the mould the cores would remain with the tire, whereupon by striking the tire one could break the cores so that these broken cores could be shaken out of the tire.

It is, however, difficult to empty the chambers completely from the sand or other hard elements of which the cores consist, and as these elements, during the use of the tire, may penetrate into the rubber mass, there is a considerable risk that the tire may be destroyed from the inside. Use has also been made of permanent cores made of metal, but these have a very complicated form and often the single core will have to be composed of a number of separate elements. The result has been that the removal of such cores from the tire has been a most complicated and time consuming procedure.

An important object of the present invention is to do away with these difficulties such as those referred to above. According to the present invention the body of the tire, consisting of a transverse projection or flanges and at least one outer rim connecting the latter as a unit, is cast. The casing is then vulcanized onto the outside of this cast unit. During vulcanization, an inside pressure is maintained in the chambers substantially corresponding to the outer pressure in the mould. In this manner distortion or deformation of the transverse walls as well as penetration of the rubber masses of the casing into the chambers due to differences in air pressure is prevented.

It will be seen that the application of separate cores of any kind can be avoided, since, according to the present invention, in the construction of the case unit, the chambers between the transverse walls may also be cast in a mould consisting of two parts. This mould has detachable cores which may be inserted to form the said chambers, said cores being removed from the case unit subsequent to its removal from its mould, but before it is placed in the vulcanization mould. The vulcanization takes place in the mould which is used in casting in the original unit as well as in the mould which is used for the purpose of vulcanizing the tire casing onto the original unit. For the purposes of clarity the mould for casting the original unit will be termed the casting mould, whereas the mould used in vulcanizing the casing on the unit will be termed the vulcanizing mould. According to a preferable method of employing the invention the unit may be placed in a vulcanizing mould consisting of two parts in which the unit is surrounded by two or more layers of unvulcanized rubber which serve to form the casing of the tire by vulcanization.

Before placing the unit in the vulcanization mould one has to take care that it is properly cemented with a rubber solution in benzol or benzin in order to secure a reliable vulcanization of the casing to the unit.

Both the casting mould and the fixed cores and also the vulcanizing mould may be divided lengthwise at right angles to the section.

In order to facilitate the understanding of the invention the drawings show several embodiments for the moulds to be used in the method as well as some of the elements cast in these moulds.

The invention will be easily understood by reference to the following specification when read in conjunction with the accompanying drawings in which:

Figs. 4–8 show in perspective, portions of various embodiments of the inner unit;

Figs. 9–12 show various other embodiments of the same invention;

Fig. 13 is a perspective view of a mould with removable cores; and

Fig. 14 is a perspective view of a further embodiment of the cores in the mould shown in Fig. 1.

Figure 1:
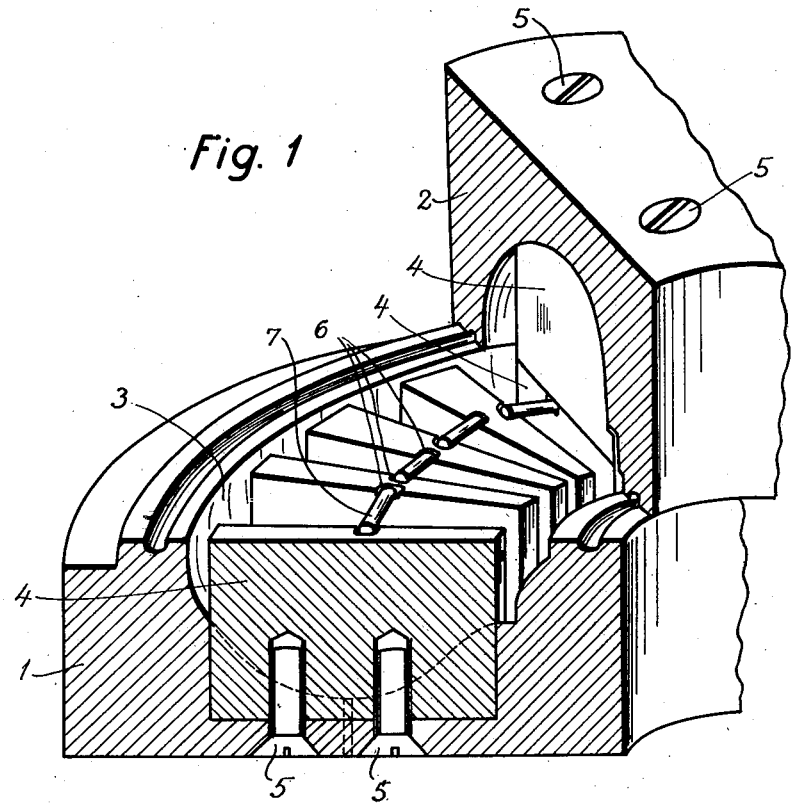
Fig. 1 is a perspective view, partly in section, of a casting mould in which the inner resilient unit of a rubber tire for autos is to be cast.

In a mould, Fig. 1, consisting of two halves 1 and 2, is a generally circular space 3, with a number of projecting rectangular cores 4. Each core is divided into two halves like the mould and each half is fixed in one of the mould halves 1 or 2 with screws 5.

The lower core part 4 has recesses 6 in which small bridges 7 are situated. The bridges consist of metal pins. The cores 4 could be replaced by cores 42 of the kind shown in Fig. 13. By fixing a screw in a screw hole 43 in the core 42, the core 42 can be drawn out of the mould before opening of the same. Alternatively, the core 42 could be removed from the cast unit after its removal from the mould.

Figure 2:
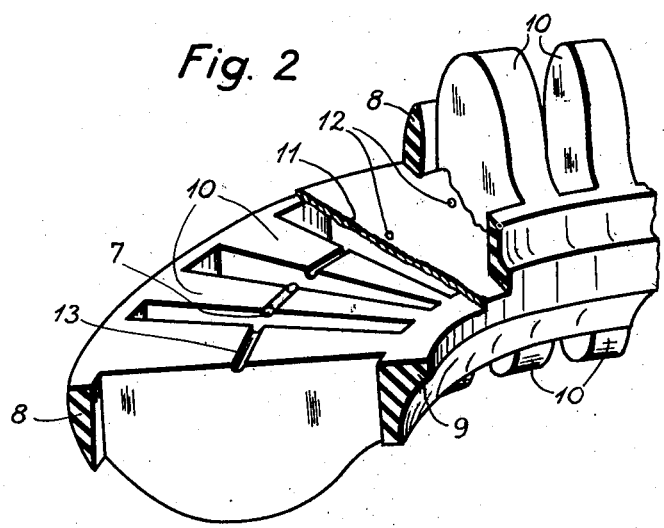
Fig. 2 is a perspective view, partly in section, of a part of the said unit after removal from the mould.

The cast unit is shown in Fig. 2. It consists of an outer rim 8, and an inner rim 9 which connect a number of transverse walls 10. In the central plane of the unit is formed a thin wall 11 in which small holes 12 are formed as by burning with a glowing pin. The small bridges 7 may, however, be replaced by thicker bridges 44 (Fig. 14) which are positioned partly in the recesses in the upper core portion 4, whereby a canal is formed in a wall 10 (Fig. 2) which will communicate with the spaces on both sides of the thin wall 11. When the unit is removed from the mould, the small bridges 7 will remain in the unit from which they can be drawn out by means of a pair of nippers or tongs (not shown) leaving small canals 13 (Fig. 2) penetrating the transverse walls 10.

Figure 3:
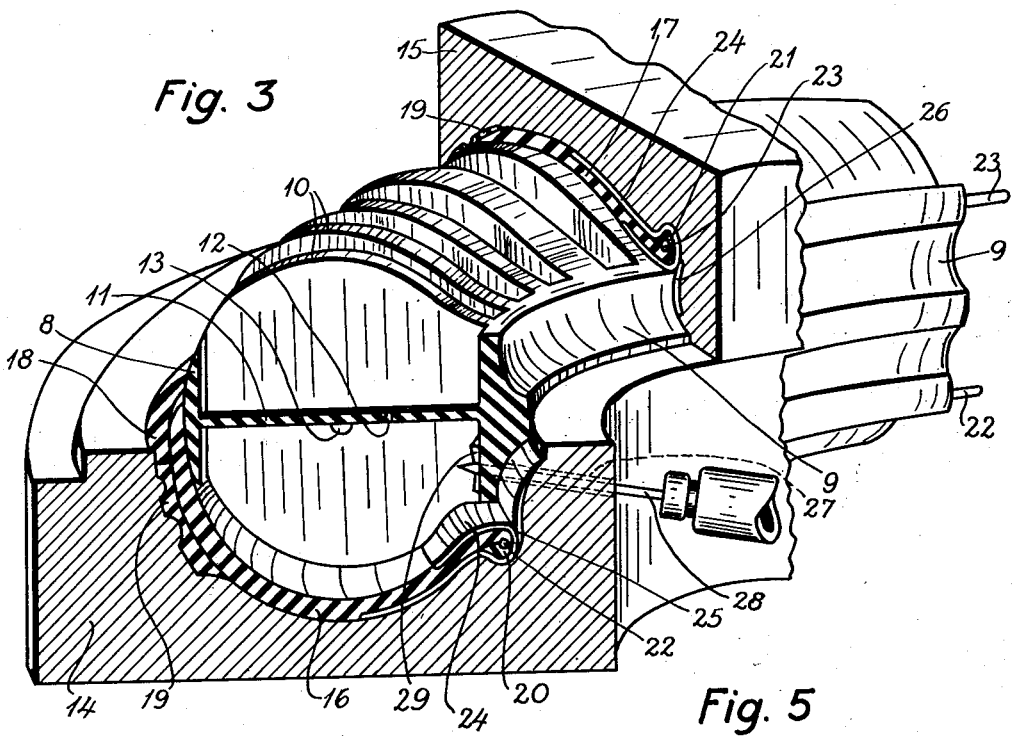
Fig. 3 is a perspective view partly in section of a vulcanizing mould in which the said unit is placed surrounded by unvulcanized rubber sheets, the unit and sheet being shown.

The cast unit is now placed in a vulcanizing mould as shown in Fig. 3. The two halves 14 and 15 of this mould are first lined with some unvulcanized rubber sheets which are to form the casing of the tire. Each side of this lining consists of a rubber sheet as shown at 16 and 17 and the sheets meet along a conical surface 18 in the vicinity of the central plane of the tire. Another sheet 19 forms the tire tread. A small rubber band 20 and 21 is situated in each side to surround a bead core 22 and 23. Finally canvas is wrapped round the bead. On each side of the rim 9 is situated a thin unvulcanized sheet 25 and 26. The unvulcanized sheets are cemented with a solution of rubber in petrol or benzol for obtaining a reliable connection with the inner unit during the vulcanization to follow.

During the vulcanization an inner pressure is produced in the chambers between the transverse walls 10 by means of compressed air introduced through a tube 28. The said tube is slidably mounted in a lining 27, and it is pointed so that it can be pressed through the rim 9 into one of the chambers. The rim 9 has on its inner wall a lining 29 consisting of an unvulcanized rubber sheet which will secure an airtight connection round the tube 28.

The air from the tube 28 will flow through the canal 13 in the transverse walls 10 and through the perforations 12 in the wall 11 to all the chambers, thereby resisting deformation of the separate transverse walls during the vulcanizing process. Furthermore, counterpressure is produced to prevent the unvulcanized rubber sheets from being pressed into the chambers as a consequence of the pressure produced by the compression of the mould halves.

The unit shown in Fig. 2 may be semivulcanized or fullvulcanized in the mould shown in Fig. 1. For instance a vulcanization in about 20 minutes at 140° C. may be considered satisfactory while a vulcanization in a mould shown in Fig. 3 could be terminated in 30 minutes at a somewhat lower temperature, for instance 125° C. These vulcanization times and temperatures depend largely on the constitution of the rubber.

In the manufacture of a tire for cars, the air could be introduced through the tube 28 at a pressure of about 7 kg./cm.², but this pressure should be so chosen that it will just allow the two mould halves to be pressed together. Generally the pressure of the air introduced through the tube 28 should be in the range of 5–20 kg./cm.².

Figure 4:
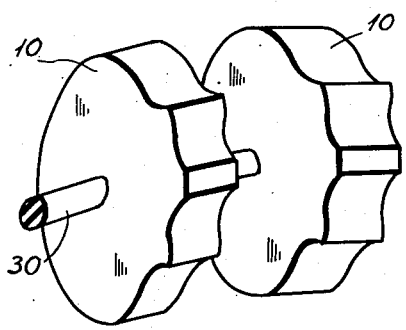
Figure 5:
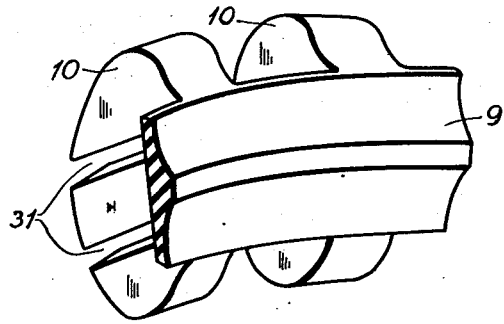
Figure 6:
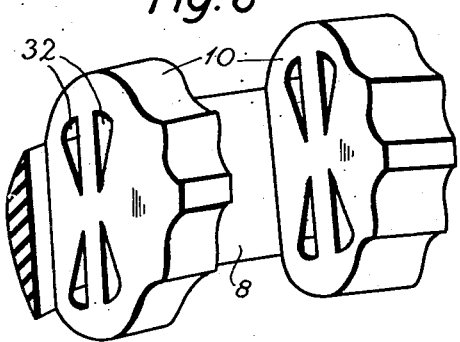
Figure 7:
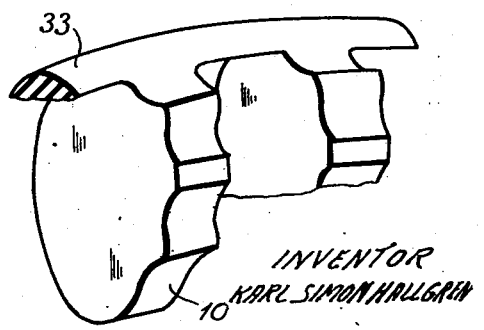

The transverse walls 10 of the unit shown in Fig. 2 could be connected by rims of another shape than the rims 8 and 9. In Fig. 4 the transverse walls 10 are connected by a thin rubber torus 30, passing through the central part of each wall 10. In Fig. 5 the said walls have slits 31 and they are connected by a single rim corresponding to the rim 9. In Fig. 6, the walls 10 are connected by a single rim 8 and the walls have perforations 32 while in Fig. 7 the walls 10 are connected by a rim 33 situated at their upper side. In Fig. 8 is shown a similar rim 33 together with a corresponding rim 34 at the lower side of the walls 10 having central perforations 35.

The transverse walls may have a varied thickness whereby the shape of the chambers will vary. In Fig. 9 the chambers 36 are substantially rectangular. In Fig. 10 the chambers 37 are somewhat tapered at their outer ends, and in Figs. 11 and 12 the chambers 38 and 39 are tapered at both ends in that they have a cross section similar to that of a pear. Between the chambers 38 and 39 small chambers 40 and 41 are formed, said small chambers having diamondlike and triangular cross sections.

Having now described my invention, what I claim as new and desire to secure by Letters Patent is:

1. Method for the manufacture of resilient rubber tires having a plurality of transverse projections dividing up the tire in chambers, said method comprising the steps of casting a body consisting of projections connected by at least one rim to form a unit, and vulcanizing a rubber casing to the said unit in a mould while applying an internal pressure in the chambers, said pressure substantially corresponding in magnitude to the outer pressure caused by the application of the mould during vulcanization, whereby any distortion or deformation of the transverse walls as well as penetration of the rubber of the casing into the chambers during vulcanization to differences in air pressure is prevented.

2. A method according to claim 1, wherein the transverse projections of the said unit are connected together by a rim running along the middle of the cross section, said vulcanizing step causing connection of the free ends of the projections with the casing of the tire.

3. A method according to claim 2, wherein the step of casting the unit includes forming the rim at the smallest diameter of the tire.

4. A method according to claim 2, wherein the step of casting the unit includes forming the rim at the largest diameter of the tire.

5. A method according to claim 2, wherein the step of casting the unit includes forming the rim at one side of the tire.

6. A method as claimed in claim 2, wherein the step of casting the unit includes forming two rims are used for the assembling of the projections.

7. A method according to claim 6, wherein the two rims are cast in either side of a rubber connecting wall.

8. A method according to claim 1, wherein the step of casting the unit includes forming transverse walls together with a rim which connects the outside ends of the walls and a second rim which connects the internal ends of the walls.

9. A method according to claim 1, including the steps of manufacturing the unit in a mould having two parts with removably inserted cores for the formation of the chambers, and removing the cores from the moulded unit.

10. A method according to claim 1, and the step of forming the moulded unit with transverse walls filling up the whole of the cross section of the tire.

11. A method according to claim 10, and the steps of forming the unit in a mould having two parts and transverse core members annularly spaced around the mould, placing core bridges between transverse core members for the formation of passage ways between the chambers, retaining said bridges in the moulded unit when this is taken out of the mould, and later removing said bridges from the transverse walls.

12. A method according to claim 11, and the step of manufacturing the unit with a thin wall in the center plane of the unit across each chamber.

13. A method according to claim 1, and the step of producing the compressed air in the inner of the chambers by means of a tube situated in and leading to at least one of the chambers, all of which chambers communicate with each other.

14. A method according to claim 13, and the step of maintaining the compressed air in the inner of the chambers at such a high value during the vulcanization that the mould halves will just be kept pressed together.

15. A method according to claim 1, and the step of placing the cast unit in a mould consisting of two halves which are lined by unvulcanized rubber sheets, which sheets are to form the casing of the tire at the vulcanizing process.

16. A method according to claim 1, including the step of vulcanizing the casing to the cast unit in a mould which is divided into two halves along the center plane of the tire.

17. A method according to claim 15, and the step of forming the casing by two rubber sheets forming a lining on each side of the circular space in the vulcanizing mould, placing a rubber sheet to form the tire tread and at each a rim to reinforce the edge and to surround a possible tire bead wire, and placing canvas to reinforce the bead outside and inside.

KARL SIMON HALLGREN.

REFERENCES CITED

The following references are of record in the file of this patent:

UNITED STATES PATENTS

| Number | Name | Date |
|---|---|---|
| 684,050 | Falconnet et al. | Oct. 8, 1901 |
| 882,341 | Pepper | Mar. 17, 1908 |
| 1,351,156 | Burnett et al. | Aug. 31, 1920 |
| 1,367,496 | Ostberg et al. | Feb. 1, 1921 |
| 1,459,544 | McLeroth | June 19, 1923 |
| 1,637,465 | Bierman | Aug. 2, 1927 |
| 1,812,821 | De Mattia | June 30, 1931 |
| 1,827,668 | Musselman | Oct. 13, 1931 |
| 2,007,825 | Day | July 9, 1935 |
| 2,273,283 | Pfeiffer | Feb. 17, 1942 |
| 2,476,884 | Maynard | July 19, 1949 |
| 2,497,226 | McNeill | Feb. 14, 1950 |